United States Patent
Briscoe et al.

(10) Patent No.: US 11,996,746 B2
(45) Date of Patent: May 28, 2024

(54) METHOD AND APPARATUS FOR TRANSFER MOLDING OF ELECTRIC MOTOR CORES AND MAGNETIZABLE INSERTS

(71) Applicants: Ford Global Technologies, LLC, Dearborn, MI (US); ABB Inc., Auburn Hills, MI (US)

(72) Inventors: Mark E. Briscoe, Milford, MI (US); Nick Sochacki, Ann Arbor, MI (US); Al Marrocco, Windsor (CA); Jeffrey Cameron, Lake Orion, MI (US); Michael Mollan, Lake Orion, MI (US)

(73) Assignees: Ford Global Technologies, LLC, Dearborn, MI (US); ABB Inc., Auburn Hills, MI (US)

( * ) Notice: Subject to any disclaimer, the term of this patent is extended or adjusted under 35 U.S.C. 154(b) by 562 days.

(21) Appl. No.: 17/161,175

(22) Filed: Jan. 28, 2021

(65) Prior Publication Data
US 2022/0239206 A1    Jul. 28, 2022

(51) Int. Cl.
*B29C 45/73*    (2006.01)
*H02K 15/12*    (2006.01)

(52) U.S. Cl.
CPC .................... *H02K 15/12* (2013.01)

(58) Field of Classification Search
CPC ........ B29C 45/73; B29C 45/14; H02K 15/12; H02K 1/27
USPC ............................................... 264/272, 272.2
See application file for complete search history.

(56) References Cited

U.S. PATENT DOCUMENTS

| 7,854,056 | B2 | 12/2010 | Watanabe et al. |
| 9,240,709 | B2 | 1/2016 | Kato et al. |
| 2018/0287439 | A1 | 10/2018 | Degner et al. |
| 2019/0089231 | A1 | 3/2019 | Ishimatsu et al. |

FOREIGN PATENT DOCUMENTS

| CN | 105490473 | 11/2017 |
| CN | 104993654 | 10/2018 |
| CN | 105656260 | 1/2019 |
| CN | 109586529 | 4/2019 |
| JP | 5799605 | 10/2015 |
| JP | 6040508 | 12/2016 |

OTHER PUBLICATIONS

English translation of JP6040508 (Year: 2016).*
Delo, Electric Motor Magnet Bonding: Increasing UPH with Fixation-Aid-Free Process Design, Video Images.

* cited by examiner

*Primary Examiner* — Jeffrey M Wollschlager
*Assistant Examiner* — Xue H Liu
(74) *Attorney, Agent, or Firm* — Burris Law, PLLC (57) ABSTRACT

A method of securing magnetizable inserts within cores of an electric converter includes placing an assembly of rotor cores in a transfer molding press, the magnetizable inserts being disposed within cavities of the rotor cores and the cavities of the rotor cores being in fluid communication, placing a polymer preform proximate a central portion of the assembly of rotor cores, displacing the polymer preform such that the polymer preform changes state and flows radially and then axially through each of the cavities of the rotor cores, removing the assembly of rotor cores from the transfer molding press, and removing polymer waste from the assembly of rotor cores.

19 Claims, 9 Drawing Sheets

METHOD AND APPARATUS FOR TRANSFER MOLDING OF ELECTRIC MOTOR CORES AND MAGNETIZABLE INSERTS

CROSS-REFERENCE TO RELATED APPLICATIONS

This application is related to copending applications filed concurrently herewith titled "METHOD AND SYSTEM FOR ASSEMBLING A ROTOR STACK FOR AN ELECTRIC MOTOR," "ROTOR ASSEMBLY METHOD AND SYSTEM EMPLOYING CENTRAL MULTI-TASKING ROBOTIC SYSTEM," and "INTEGRATED ROBOTIC END EFFECTORS HAVING END OF ARM TOOL GRIPPERS," which are commonly assigned with the present application and the contents of which are incorporated herein by reference in their entireties.

FIELD

The present disclosure relates to the manufacture of electric motors, and more particularly to the assembly of rotor cores and magnets for such electric motors.

BACKGROUND

The statements in this section merely provide background information related to the present disclosure and may not constitute prior art.

With the continuing electrification trend in motor vehicles, related components such as electric motors for electric vehicle powertrains are being developed for high volume production. These electric motors are complex assemblies, typically including a stator and a rotor made up of a plurality of rotor cores with a plurality of magnets disposed in pockets of the rotor cores. Such a construction can be seen, by way of example, in U.S. Publication No. 2018/0287439, which is commonly owned with the present application and the contents of which are incorporated herein by reference in their entirety.

Assembly of these electric motors can be time consuming and challenging given the complexity of the design of the rotor cores and their embedded magnets. Further, providing a secure connection between the plurality of magnets within the rotor core pockets while achieving assembly efficiency for high volume production can be difficult. Adhesive materials have been used to secure the magnets within the rotor core pockets, however, precisely controlling the volume of adhesive and its curing behavior has proven to be challenging.

These issues related to the manufacture of electric motors, including issues with securing magnets in rotor core pockets, are addressed by the present disclosure.

SUMMARY

This section provides a general summary of the disclosure and is not a comprehensive disclosure of its full scope or all of its features.

In one form, a method of securing magnetizable inserts within cores of an electric converter is provided that comprises: placing an assembly of rotor cores in a transfer molding press, the magnetizable inserts being disposed within cavities of the rotor cores and the cavities of the rotor cores being in fluid communication; placing a polymer preform proximate a central portion of the assembly of rotor cores; displacing the polymer preform such that the polymer preform changes state and flows radially and then axially through each of the cavities of the rotor cores; removing the assembly of rotor cores from the transfer molding press; and removing polymer waste from the assembly of rotor cores.

In variations of this method, which may be implemented individually or in any combination: the assembly of rotor cores is preheated before being placed into the transfer molding press; the polymer preform is preheated before being placed into the transfer molding press; the assembly of rotor cores is weighed before being placed into the transfer molding press and is weighed after being removed from the transfer molding press, wherein a difference in weight is compared with a predefined weight value to determine a fill volume of the cavities; the assembly of rotor cores is placed into the transfer molding press and removed from the transfer molding press by a robot; the polymer preform defines a cylindrical geometry; the polymer preform is a thermoset material; the polymer preform is displaced vertically such that the polymer flows distally, in a gravitational direction, through the cavities; the assembly of rotor cores further comprises upper and lower tooling; and the cavities of the rotor cores are radially staggered between adjacent rotor cores.

In another form of the present disclosure, a method of securing magnetizable inserts within cores of an electric converter is provided that comprises: weighing an assembly of rotor cores, the magnetizable inserts being disposed within cavities of the rotor cores and the cavities of the rotor cores being in fluid communication; preheating the assembly of rotor cores; placing the assembly of rotor cores in a transfer molding press; preheating a polymer preform; placing the preheated polymer preform proximate a central portion of the assembly of rotor cores; displacing the polymer preform such that the polymer preform changes state and flows radially and then axially through each of the cavities of the rotor cores to form a bonded assembly; removing the assembly of rotor cores from the transfer molding press; removing polymer waste from the assembly of rotor cores; and weighing the bonded assembly.

In variations of this method, which may be implemented individually or in any combination: the assembly of rotor cores further comprises upper and lower tooling, wherein the upper tooling and the polymer waste are removed before weighing the bonded assembly; the assembly of rotor cores is placed into the transfer molding press and removed from the transfer molding press by a robot; the polymer preform defines a cylindrical geometry; and the polymer preform is a thermoset material.

In yet another form of the present disclosure, an apparatus for securing magnetizable inserts within rotor cores of an electric converter is provided that includes an upper tool comprising a plurality of runners and gates, a plurality of stacked rotor cores disposed adjacent to the upper tool, the magnetizable inserts being disposed within cavities of the rotor cores and the cavities of the rotor cores being in fluid communication, and a lower tool disposed adjacent to the plurality of stacked rotor cores, opposite the upper tool, wherein the lower tool comprises a central mandrel extending through a center of the plurality of stacked rotors, the lower tool further comprising a plurality of ventings. The runners of the upper tool and the cavities of the rotor cores are in fluid communication to allow a polymer to flow radially through the runners and axially through the cavities of the rotor cores during a molding process to secure the magnetizable inserts to the rotor cores.

In variations of this apparatus, which may be implemented individually or in any combination: the upper tool further comprises a topside runnerplate and a bottomside vent plate; the lower tool comprises a plurality of ventings; the cavities of the rotor cores are radially staggered between adjacent rotor cores; and the upper tool and the lower tool define locating features to position the plurality of stacked rotor cores within the apparatus.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
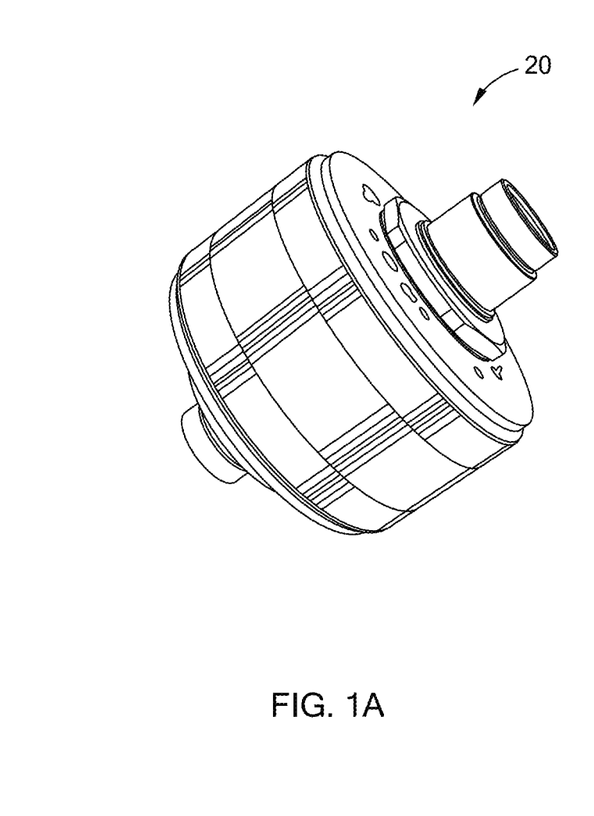
FIG. 1A is a perspective view of an electric converter to which the teachings of the present disclosure are applied.
Figure 1B:
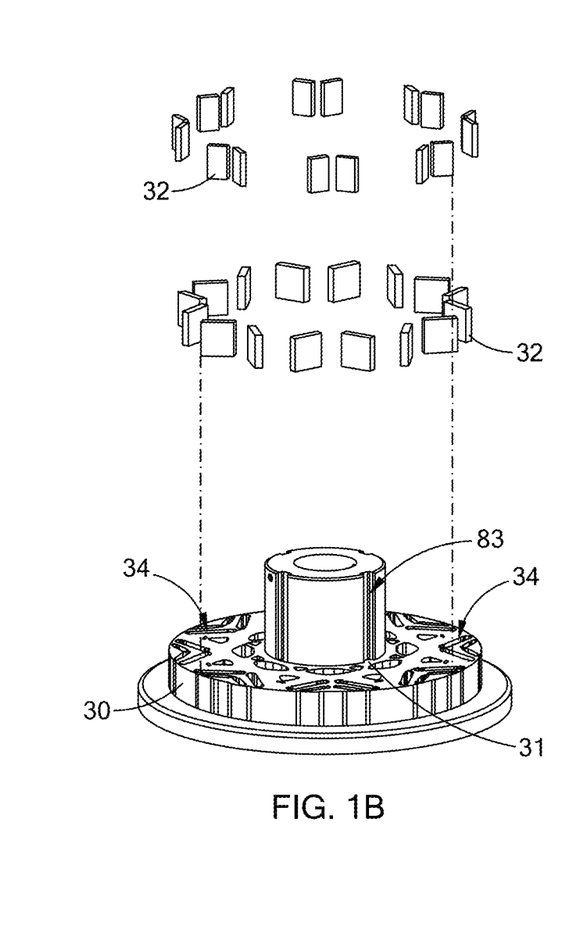
FIG. 1B is an exploded view of a rotor core and magnetizable inserts of the electric converter of FIG. 1A.

Referring to FIGS. 1A and 1B, an electric converter to which the teachings of the present disclosure are applied is illustrated and generally indicated by reference numeral 20. The electric converter 20 generally includes a plurality of rotor cores 30 (only one shown in FIG. 1B for purposes of clarity) and a plurality of magnetizable inserts 32 disposed within cavities 34 of the rotor cores 30. As set forth above, construction of such an electric converter 20 is described in greater detail in U.S. Publication No. 2018/0287439, which has been incorporated herein by reference in its entirety. Advantageously, the present disclosure provides an innovative and efficient method and a related apparatus for securing the magnetizable inserts 32 within the cavities 34 of the rotor cores 30.

Figure 2:
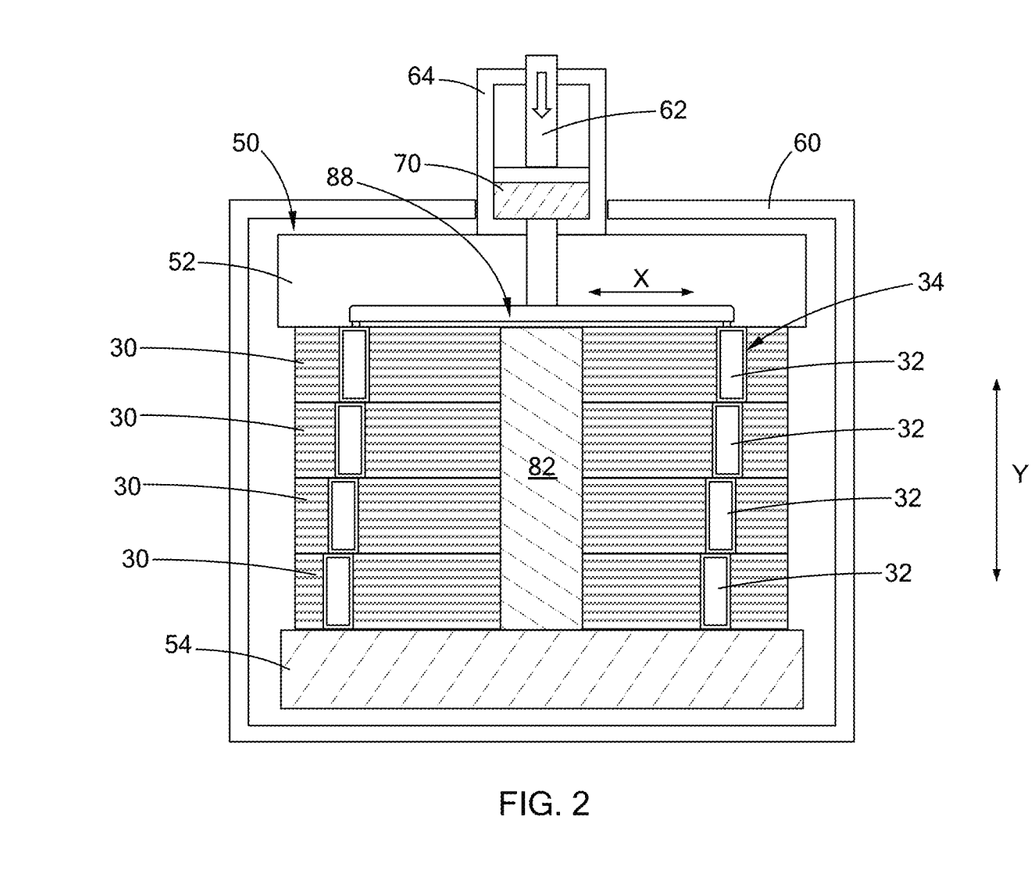
FIG. 2 is a schematic cross-sectional view of an apparatus for securing magnetizable inserts within rotor cores of an electric converter in accordance with the teachings of the present disclosure.
Figure 3:
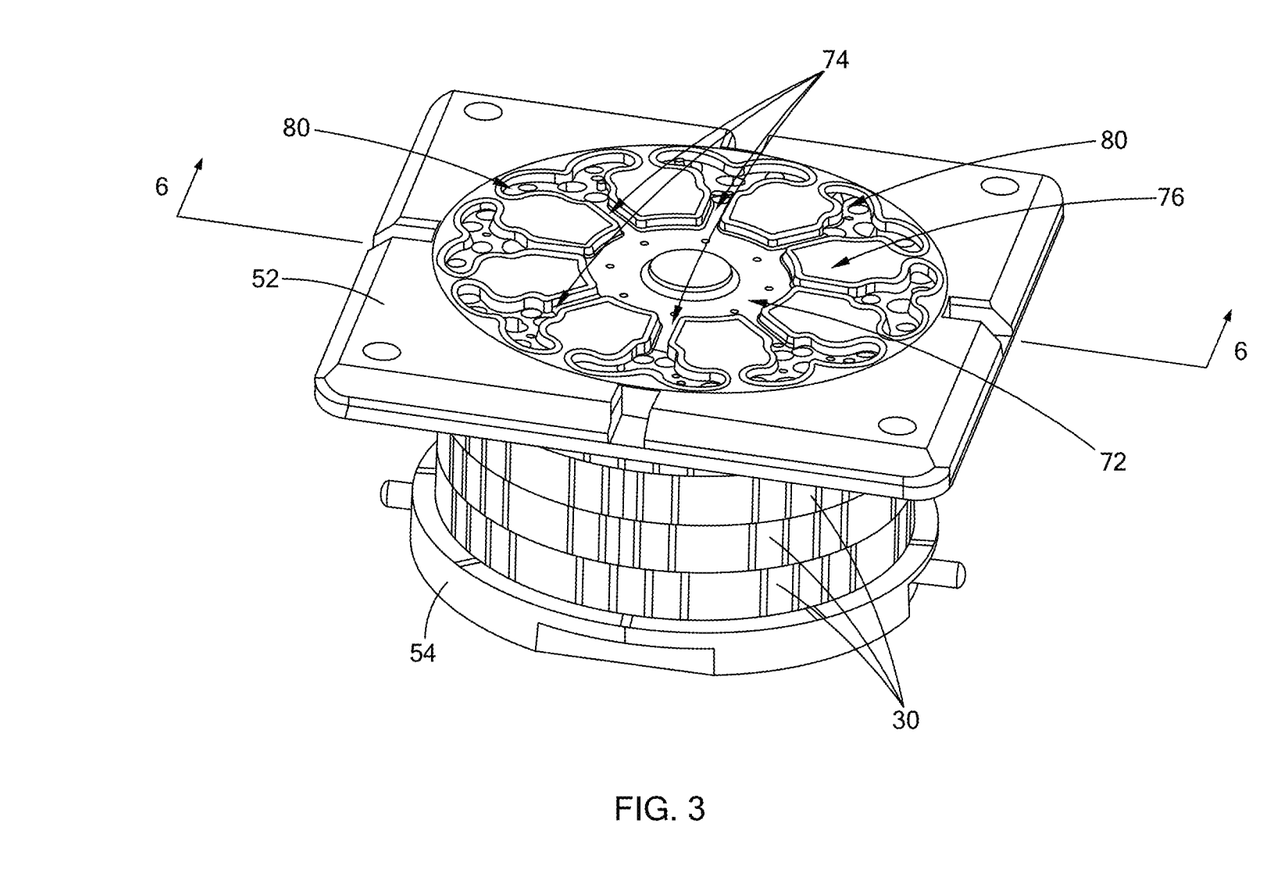
FIG. 3 is a perspective view of an assembly of rotor cores and tooling constructed according to the teachings of the present disclosure.
Figure 4:
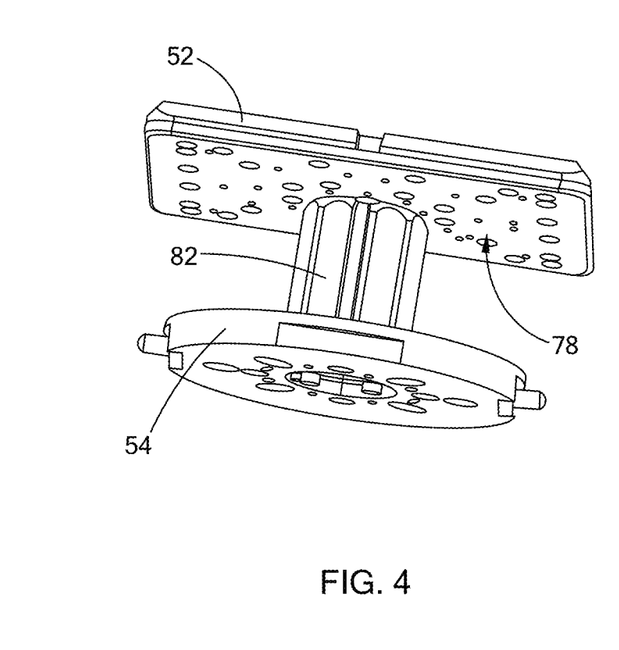
FIG. 4 is a perspective view of the tooling of FIG. 3.
Figure 5:
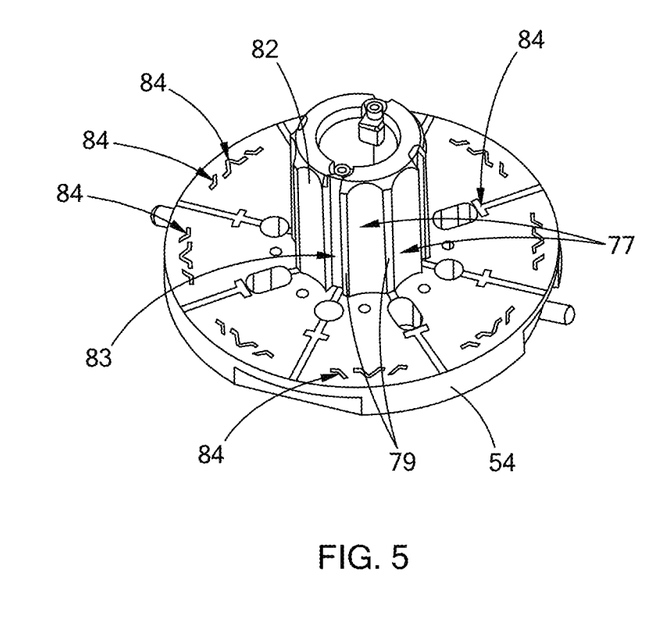
FIG. 5 is a perspective view of the lower tooling of FIG. 4 constructed according to the teachings of the present disclosure.

Referring to FIG. 2, an apparatus for securing the magnetizable inserts 34 within the rotor cores 30 is schematically illustrated and generally indicated by reference numeral 50. The apparatus 50 generally includes an upper tool 52, a lower tool 54, and a plurality of stacked rotor cores 30 disposed between the upper tool 52 and the lower tool 54. The magnetizable inserts 32 are disposed within the cavities 34 of the rotor cores 30 as shown, and the cavities 34 are in fluid communication. In other words, the cavities 34 are open to each generally other along an axial direction "Y" as shown such that an adhesive material can flow through each of the cavities 34 during molding as set forth in greater detail below.

The apparatus 50 is disposed within a transfer molding press 60, which comprises a plunger 62 disposed within a housing 64. The plunger 62 functions to displace the adhesive, which in one variation is a polymer preform 70, during molding. The polymer preform 70 as shown generally defines a cylindrical geometry before molding, or a puck-like shape. However, it should be understood that other geometries may be employed while remaining within the scope of the present disclosure. In one form, the polymer preform 70 is a thermoset material, such as by way of example, an epoxy. It should be understood, however, that other types of thermoset materials or polymer materials (e.g., thermoplastics) may be employed while remaining within the scope of the present disclosure.

Referring now to FIGS. 3-7, the upper tool 52 and the lower tool 54 are illustrated and described in greater detail. The upper tool 52 comprises a runner cavity 72 connecting a plurality of runners 74, along a topside runnerplate 76. The upper tool 52 in one form also includes a bottomside runnerplate 78. A plurality of gates 80 extend from the runners 74 to the cavities 34. The plurality of runners 74 and gates 80 receive and direct a flow of the polymer preform 70 after it changes state (i.e. from a solid to a liquid) and becomes molten during the molding process as described in greater detail below.

The lower tool 54 is disposed adjacent to the plurality of stacked rotor cores 30, opposite the upper tool 52 such that the rotor cores 30 are "sandwiched" between the upper tool 52 and the lower tool 54. The lower tool 54 comprises a central mandrel 82, which extends through a center of the plurality of stacked rotors 30 (best shown extending through the center in FIG. 2). In one form, the mandrel 82 comprises keyways 83, which mate with tabs 31 (shown in FIG. 1B) to properly locate/align the rotor cores 30 within the assembly. In another form, the mandrel 82 is also "scalloped" with a series of cutouts 77 and ridges 79 extending around its periphery. Accordingly, the ridges 79 provide reduced contact area with the rotor cores 30, thus reducing friction when removing the rotor cores 30 from the lower tool 54 and mandrel 82 after molding.

The lower tool 54 further comprises a plurality of ventings 84, which provide vents for air to escape the apparatus 50 during the molding process. The runners 74 and the gates 80 of the upper tool 52, and the cavities 34 of the rotor cores, are in fluid communication to allow the polymer preform 70 to flow radially, in a direction indicated by arrow "X" through the runners 74, then axially along direction "Y" through the gates 80, and then continuing along direction "Y" through each of the cavities 34 of the rotor cores 30 during the molding process to secure the magnetizable inserts 32 to the rotor cores 30.

Figure 8:
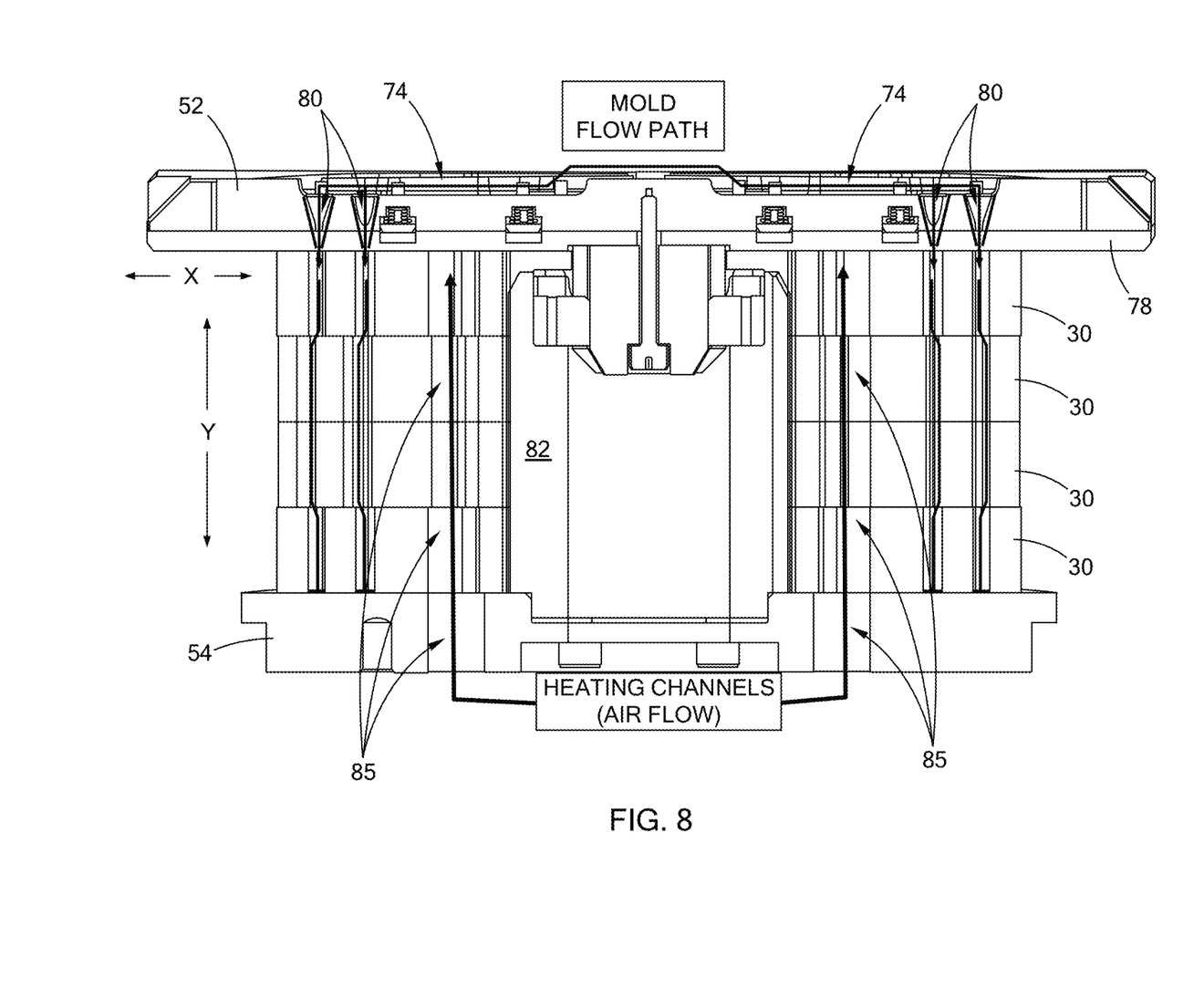
FIG. 8 is a cross-sectional view of the assembly of rotor cores and tooling illustrating flow paths for the molten polymer and heat according to the teachings of the present disclosure.

More specifically, and with reference to FIG. 8, the upper tool 52, lower tool 54, and stacked rotor cores 30 are shown to illustrate flow paths of the molten polymer and heating channels (air flow) for the molding process. As shown, the molten polymer flows radially along the runners 74 and then axially through the gates 80, and then through the cavities 34 of the rotor cores 30. The lower tool 54 and the rotor cores 30 include passageways 85 disposed along an inner portion of the apparatus 50, which provide heating channels, or a conduit for air flow, during the molding process.

Figure 6:
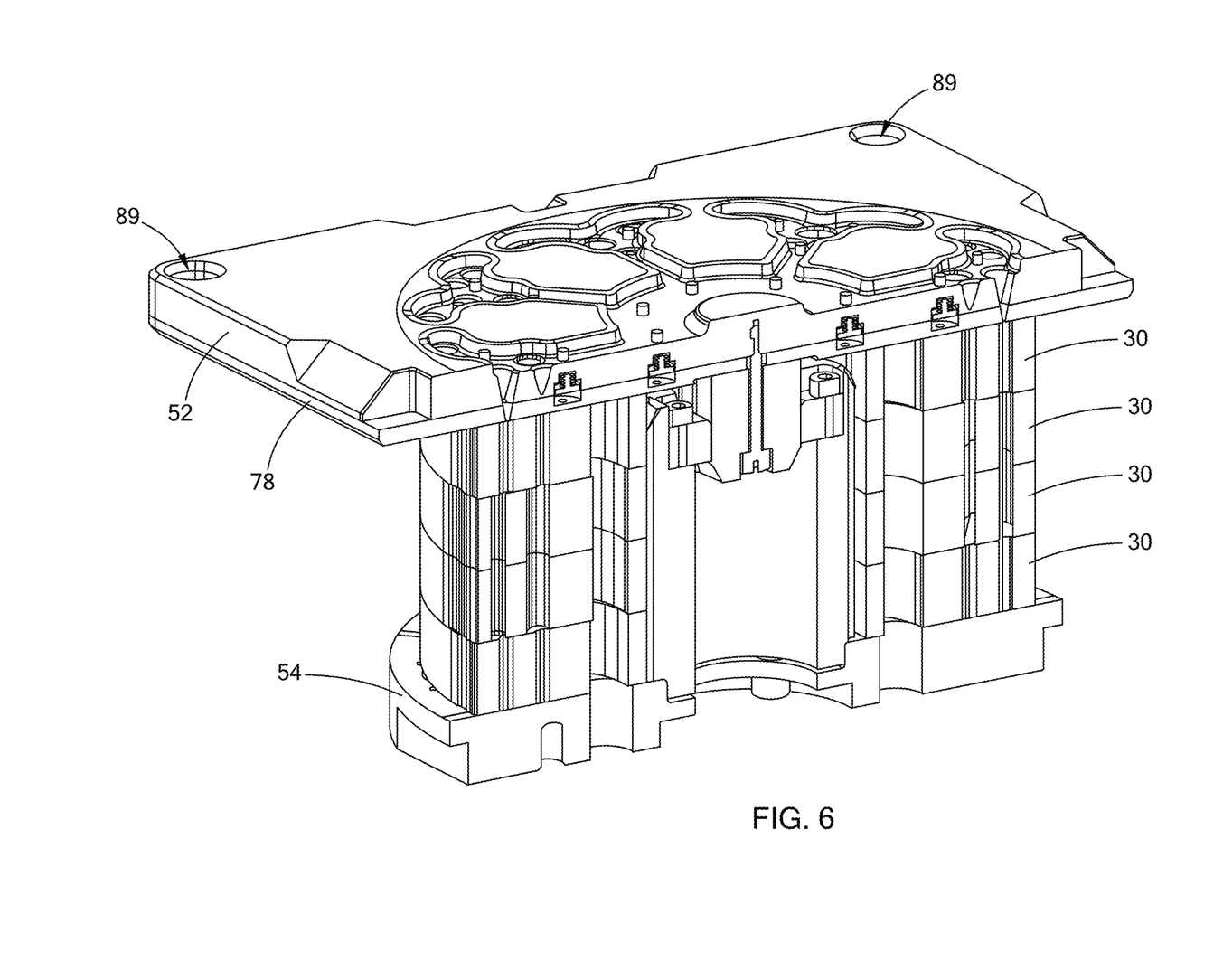
FIG. 6 is a perspective cross-sectional view of the assembly of FIG. 3, taking along line 6-6.
Figure 7:
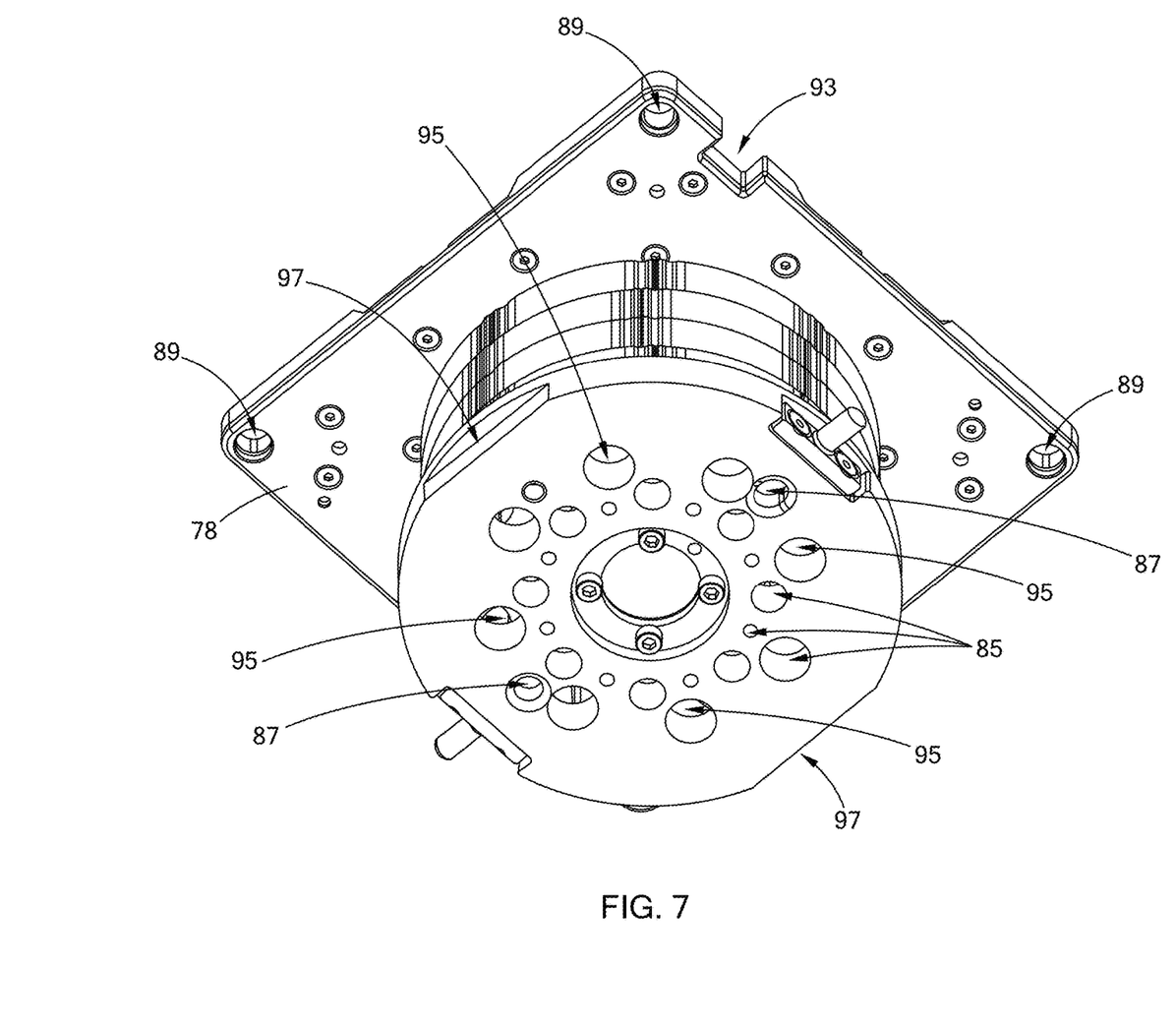
FIG. 7 is a bottom perspective view of the assembly of FIG. 3.

In one form, the cavities 32 of the rotor cores 30 are radially staggered between adjacent rotor cores as shown. Further, the upper tool 52 and the lower tool 54 define locating features to position the plurality of stacked rotor cores 30 within the apparatus 50. As best shown in FIGS. 6 and 7, the lower tool 54 include locating apertures 87 that interface with features/pins (not shown) of the transfer molding press 60 to locate the lower tool 54 for the molding process. Similarly, the upper tool 52 comprises locating apertures 89. As further shown, the upper tool 52 comprises an optional notch 93 (which mates with a corresponding feature of the transfer molding press 60, not shown) to ensure that the apparatus 50 is properly located for molding. The lower tool 54 also includes additional apertures 95, which are used for insertion of a tool to remove or push the rotor cores 30 off of the mandrel 82/lower tool 54. Further, one or more flats 97 may be formed in the lower tool 54 for proper radial orientation in the transfer molding press 60.

Figure 9:
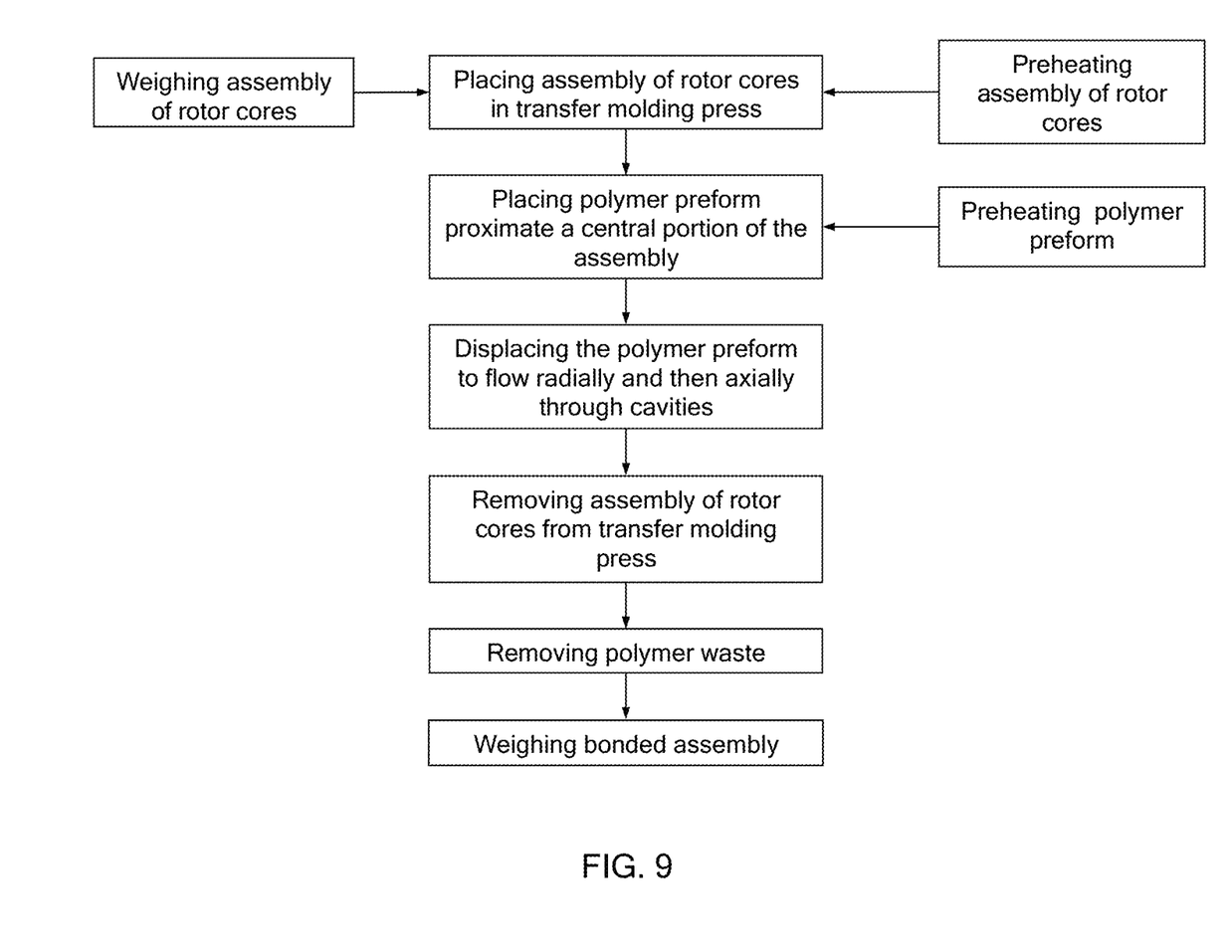
FIG. 9 is a flow diagram illustrating a method of securing magnetizable inserts within rotor cores of an electric converter according to the teachings of the present disclosure.

Referring now to FIGS. 2, 8, and 9, a method of securing the magnetizable inserts 32 within the rotor cores 30 is generally illustrated. The method comprises placing an assembly of rotor cores 30 in the transfer molding press 60, wherein the magnetizable inserts 32 are disposed within the cavities 34 of the rotor cores 32. (Generally, the "assembly of rotor cores" as used herein includes the rotor cores 30 and the magnetizable inserts 32). As previously set forth, the cavities 34 of the rotor cores 30 are in fluid communication with each other and with the runners 74 and gates 80.

Before placing the assembly of rotor cores 30 in the transfer molding press 60, the assembly of rotor cores 30 may optionally be preheated, and the polymer preform 70 may also be optionally preheated in one form of the present disclosure. In another variation, the assembly of rotor cores 30 is weighed before being placed into the transfer molding press 60. In one form, the assembly of rotor cores 30 and the lower tool 54 are weighed together. Similarly, in one form, the assembly of rotor cores 30 with the lower tool 54, and optionally the upper tool 52, are preheated before being placed into the transfer molding press 60.

The polymer preform 70 is placed in the housing 64, below the plunger 62, of the transfer molding press 60 and proximate a central portion 88 of the assembly of rotor cores 30. Alternately, the polymer preform 70 may be placed on top of the upper tool 52, proximate the central portion 88, prior to molding. Within the transfer molding press 60, heat and a transfer pressure are applied, and the plunger 62 moves downward to displace the polymer preform 70 such that the polymer preform 70 changes state and flows radially, along the direction X, and then axially, along the direction Y, through the runners 74, the gates 80, and subsequently the cavities 34 of the rotor cores 30.

A clamping force is provided by the transfer molding press 60 to the upper tool 52 and the lower tool, which varies in magnitude depending on the number and size of rotor cores 30 and the volume of the cavities 34 being filled by the polymer preform 70. In one form, the central mandrel 82 of the lower tool 54 is spring-loaded in order to apply additional forces when clamping. The clamping force continues to be provided within the transfer molding press 60 for a predetermined period of time, or a cure time after all of the polymer preform 70 has been pressed by the plunger 62, which is a function of the specific material of the polymer preform 70. In one example, the cure time is 120 seconds for an epoxy material. Further, the transfer pressure (applied by the plunger 62) is also a function of the volume of the cavities 34 being filled by the polymer preform 70.

After the cavities 34 have been filled by the polymer preform 70, and after the predetermined period of time for curing, the assembly of rotor cores 30 is removed from the transfer molding press 60 and any polymer waste is removed from the assembly of rotor cores 30. Optionally, the assembly of rotor cores 30 is weighed after being removed from the transfer molding press 60, after removing the polymer waste, and a difference in weight is compared with a predefined weight value to determine a fill volume of the cavities 34. As set forth above, the assembly of rotor cores 30 is weighed with the lower tool 54 in one form of the present disclosure to determine the difference in weight.

In one variation of the present disclosure, the assembly of rotor cores 30 is placed into the transfer molding press 60 and removed from the transfer molding press 60 by a robot (not shown). Further, the polymer preform 70 may be placed into the transfer molding press 60 by a robot.

In the form illustrated herein, the polymer preform 70 is displaced vertically such that the polymer material of the polymer preform 70 flows distally, in a gravitational direction, through the cavities 34. However, it should be understood that the assembly of rotor cores 30 and related tooling may be oriented differently, such as in a horizontal direction rather than the vertical direction as shown, while remaining within the scope of the present disclosure.

Figure 10A:
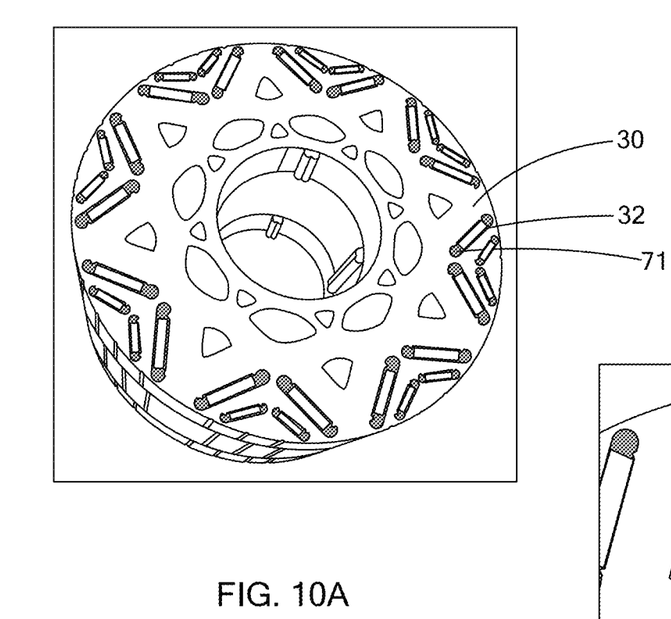
FIG. 10A is a perspective view of a plurality of rotor cores having magnetizable inserts secured within their cavities after a molding process according to the teachings of the present disclosure.
Figure 10B:
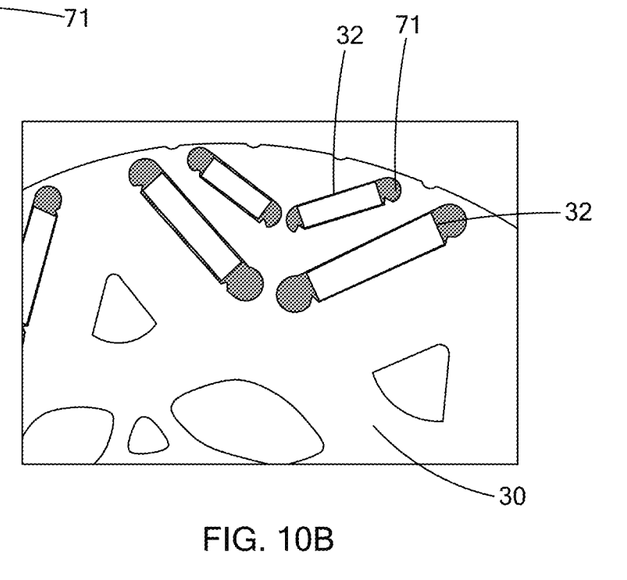
FIG. 10B is an enlarged view of magnetizable inserts secured within the cavities of a rotor core after the molding process according to the teachings of the present disclosure.

Referring now to FIGS. 10A and 10B, the completed rotor cores 30 are illustrated, with the magnetizable inserts 32 being secured within the cavities 34 by a polymer material 71 of the polymer preform 70. As shown, the polymer material 71 has cured around the magnetizable inserts 32, thus forming a bond between the magnetizable inserts 32 and the rotor core 30.

Before arriving at the transfer molding press 60, the polymer preforms 70 are refrigerated and may be staged near the transfer molding press 60 for a period of time prior to being loaded into the plunger housing 64. In another form, the polymer preforms 70 may be included in a "loaf" or bar of polymer material, and a specific volume, or width, may be cut off of the bar as a function of the weighing steps as set forth above or other quality inspection method. For example, if the cavities 34 are not being completely filled, then an increased volume of polymer preform 70 may be cut from the bar for the next molding cycles.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. For example, while the disclosure is directed to electric motors, it should be understood that the teachings of the present disclosure may be applied to other electric/electricity converters such as generators. Such variations are not to be regarded as a departure from the spirit and scope of the disclosure.

What is claimed is:

1. A method of securing magnetizable inserts within cores of an electric converter, the method comprising:
   placing an assembly of rotor cores in a transfer molding press, the magnetizable inserts being disposed within cavities of the rotor cores and the cavities of the rotor cores being in fluid communication;
   placing a polymer preform proximate a central portion of the assembly of rotor cores;
   displacing the polymer preform such that the polymer preform changes state and flows radially and then axially through the cavities of the rotor cores;
   removing the assembly of rotor cores from the transfer molding press; and
   removing polymer waste from the assembly of rotor cores,
   wherein the assembly of rotor cores is weighed before being placed into the transfer molding press and is weighed after being removed from the transfer molding press, wherein a difference in weight is compared with a predefined weight value to determine a fill volume of the cavities.

2. The method according to claim 1, wherein the assembly of rotor cores is preheated before being placed into the transfer molding press.

3. The method according to claim 1, wherein the polymer preform is preheated before being placed into the transfer molding press.

4. The method according to claim 1, wherein the assembly of rotor cores is placed into the transfer molding press and removed from the transfer molding press by a robot.

5. The method according to claim 1, wherein the polymer preform defines a cylindrical geometry.

6. The method according to claim 1, wherein the polymer preform is a thermoset material.

7. The method according to claim 1, wherein the polymer preform is displaced vertically such that the polymer flows distally, in a gravitational direction, through the cavities.

8. The method according to claim 1, wherein the assembly of rotor cores further comprises upper and lower tooling.

9. The method according to claim 1, wherein the cavities of the rotor cores are radially staggered between adjacent rotor cores.

10. A method of securing magnetizable inserts within cores of an electric converter, the method comprising:
    weighing an assembly of rotor cores, the magnetizable inserts being disposed within cavities of the rotor cores and the cavities of the rotor cores being in fluid communication;
    preheating the assembly of rotor cores;
    placing the assembly of rotor cores in a transfer molding press;
    preheating a polymer preform;
    placing the preheated polymer preform proximate a central portion of the assembly of rotor cores;
    displacing the polymer preform such that the polymer preform changes state and flows radially and then axially through the cavities of the rotor cores to form a bonded assembly;
    removing the bonded assembly from the transfer molding press;
    removing polymer waste from the bonded assembly; and
    weighing the bonded assembly.

11. The method according to claim 10, wherein the assembly of rotor cores further comprises upper and lower tooling, wherein the upper tooling and the polymer waste are removed before weighing the bonded assembly.

12. The method according to claim 11, wherein the assembly of rotor cores is placed into the transfer molding press and removed from the transfer molding press by a robot.

13. The method according to claim 10, wherein the polymer preform defines a cylindrical geometry.

14. The method according to claim 10, wherein the polymer preform is a thermoset material.

15. The method according to claim 10, wherein the cavities of the rotor cores are radially staggered between adjacent rotor cores.

16. The method according to claim 10, wherein the polymer preform is displaced vertically such that the polymer flows distally, in a gravitational direction, through the cavities.

17. The method according to claim 10, wherein a difference in weight between the weight of the bonded assembly and the weight of the assembly of rotor cores is compared with a predefined weight value to determine a fill volume of the cavities.

18. The method according to claim 10, wherein the polymer preform is displaced by applying heat and pressure.

19. The method according to claim 10, further comprising curing the polymer preform before removing the bonded assembly from the transfer molding press.

* * * * *